(12) United States Patent
Hara

(10) Patent No.: US 7,518,743 B2
(45) Date of Patent: Apr. 14, 2009

(54) SYSTEM, METHOD, AND APPARATUS FOR PRINTING, AND METHOD AND APPARATUS FOR ASSIGNING ORDERS

(75) Inventor: Makoto Hara, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1425 days.

(21) Appl. No.: 09/773,619

(22) Filed: Feb. 2, 2001

(65) Prior Publication Data

US 2001/0019422 A1 Sep. 6, 2001

(30) Foreign Application Priority Data

Feb. 4, 2000 (JP) ............... 2000-027966
Jan. 16, 2001 (JP) ............... 2001-007137

(51) Int. Cl.
*G06F 15/00* (2006.01)
*G06K 1/00* (2006.01)

(52) U.S. Cl. ............... 358/1.15; 358/1.1; 358/1.13; 358/1.14; 358/1.17; 358/1.18; 709/203; 709/202; 709/213; 709/219

(58) Field of Classification Search ............... 358/1.15, 358/1.16, 1.1, 1.13, 1.14, 1.18; 400/61; 709/219, 709/206, 203, 202; 382/115; 705/1, 506, 705/26; 493/364; 726/26
See application file for complete search history.

(56) References Cited

U.S. PATENT DOCUMENTS 5,287,194 A 2/1994 Lobiondo (Continued)

FOREIGN PATENT DOCUMENTS

EP 0588513 A2 3/1994

(Continued)

OTHER PUBLICATIONS

Roger M. Kerr, "A Knowledge Based, Integrated Process Planning and Scheduling System for Document Preparation", Advances in Production Management Systems, Proceedings of the 4th IFIP TC5/WG5.7 International Conference, ARMS '90, ESPOO, Finland, Aug. 20-22, 1990, pp. 497-506.

(Continued)

*Primary Examiner*—Edward L Coles
*Assistant Examiner*—Satwant K Singh
(74) *Attorney, Agent, or Firm*—Birch, Stewart, Kolasch & Birch, LLP

(57) ABSTRACT

In a printing system for printing image data based on orders from customers, a load of a laboratory having a large amount of orders can be reduced. A user transfers order information and image data from his/her personal computer to any one of customer service systems. The customer service system receiving the order information and the image data generates flow information indicating an address of the user, a logistic code, or a laboratory specification, and transfers the flow information together with the order information and the image data to an order assigning system. The order assigning system selects one of laboratories to carry out printing, based on the flow information and a table in a database representing a relationship between the flow information and the laboratories. The order assigning system transfers the order information and the image data to the selected laboratory. The laboratory prints the image data, based on the order information transferred thereto.

12 Claims, 5 Drawing Sheets

U.S. PATENT DOCUMENTS

| | | | | |
|---|---|---|---|---|
| 5,580,177 | A * | 12/1996 | Gase et al. | 400/61 |
| 5,930,810 | A * | 7/1999 | Farros et al. | 715/506 |
| 5,974,234 | A * | 10/1999 | Levine et al. | 358/1.16 |
| 5,995,723 | A * | 11/1999 | Sperry et al. | 358/1.15 |
| 6,230,187 | B1 * | 5/2001 | Suzuki | 709/206 |
| 6,266,693 | B1 * | 7/2001 | Onaga | 709/219 |
| 6,306,072 | B1 * | 10/2001 | Honegger | 493/364 |
| 6,324,521 | B1 | 11/2001 | Shiota et al. | |
| 6,381,029 | B1 * | 4/2002 | Tipirneni | 358/1.14 |
| 6,381,032 | B1 * | 4/2002 | Laverty et al. | 358/1.15 |
| 6,466,328 | B1 * | 10/2002 | Bradley et al. | 358/1.15 |
| 6,469,796 | B1 * | 10/2002 | Leiman et al. | 358/1.15 |
| 6,476,927 | B1 * | 11/2002 | Schwarz, Jr. | 358/1.15 |
| 6,526,158 | B1 * | 2/2003 | Goldberg | 382/115 |
| 6,552,813 | B2 * | 4/2003 | Yacoub | 358/1.1 |
| 6,614,549 | B1 * | 9/2003 | Hlava | 358/1.15 |
| 6,621,589 | B1 * | 9/2003 | Al-Kazily et al. | 358/1.15 |
| 6,631,008 | B2 * | 10/2003 | Aoki | 358/1.15 |
| 6,646,754 | B1 * | 11/2003 | Redd et al. | 358/1.13 |
| 6,654,137 | B1 * | 11/2003 | Yagita | 358/1.15 |
| 6,687,018 | B1 * | 2/2004 | Leong et al. | 358/1.15 |
| 6,714,964 | B1 * | 3/2004 | Stewart et al. | 709/203 |
| 6,952,780 | B2 * | 10/2005 | Olsen et al. | 726/26 |
| 6,992,794 | B2 * | 1/2006 | Keane et al. | 358/1.5 |
| 7,031,004 | B1 * | 4/2006 | Hayward et al. | 358/1.15 |
| 7,095,519 | B1 * | 8/2006 | Stewart et al. | 358/1.15 |
| 2002/0065741 | A1 * | 5/2002 | Baum | 705/26 |
| 2004/0143451 | A1 * | 7/2004 | Mcintyre et al. | 705/1 |

FOREIGN PATENT DOCUMENTS

| | | |
|---|---|---|
| EP | 0977084 A1 | 2/2000 |
| JP | 11-154218 A | 6/1999 |
| JP | 11-205503 A | 7/1999 |
| JP | 2001-188857 A | 7/2001 |

OTHER PUBLICATIONS

Peter M. Corcoran, et al., "Internet Enabled Digital Photography", IEEE, Jun. 1999, vol. 45., No. 3, pp. 577-583.

* cited by examiner

| LABORATORY | NUMBER OF ORDERS |
|---|---|
| 6 A | 4 3 2 3 |
| 6 B | 2 1 7 |
| 6 C | 1 0 2 3 |

T0

F I G. 4

SYSTEM, METHOD, AND APPARATUS FOR PRINTING, AND METHOD AND APPARATUS FOR ASSIGNING ORDERS

BACKGROND OF THE INVENTION

1. Field of the Invention

The present invention relates to a printing system, a printing method, a printing apparatus, an order assigning method and an order assigning apparatus for providing a service related to prints to customers via a network.

2. Description of the Related Art

Digital photographic service systems for carrying out digital photographic services such as storing photograph images obtained by users in image servers after digitization of the images, providing the images to the users by recording the images in CD-Rs, and receiving orders for additional prints have been known. As one form of such systems, a network photographic service system for storing (registering) users' digital images in a system of a service provider and receiving printing orders or the like via a network such as the Internet has also been proposed.

In such a network photographic service system, in order to provide digital photographic services to users, a server computer having a scanner, a printer, and a large-capacity disc (hereinafter called an image server) is installed in a wholesale laboratory. Photographs obtained by users are stored as image data in the image server. Alternatively, image data obtained by users are transferred to the image server. By enabling the users to access the image server via a network, various kinds of services, such as ordering an additional print, attaching a photograph image to an e-mail message, and downloading of image data, are provided. In such a service, a user accesses the image server by using predetermined application software installed in his/her personal computer or in an order-placing apparatus installed in a DPE store or the like, and orders an additional print or the like. Meanwhile, in the laboratory, photographic processing such as generation of an additional print, a picture postcard, an album, and a composite image, and trimming is carried out on image data based on order information from the user. Data after the processing are transferred to the user or an e-mail message notifying completion of the processing is sent to the user, for example.

The "order information" herein referred to is information such as a processing number indicating the content of a service (such as generation of an additional print or a postcard), an image number specifying a photograph, a print size, the quantity of prints, a quality of printing paper (such as glossy or non-glossy), a thickness of the paper, the content of photographic processing, and trimming specification, for example. The order information also includes information related to the user, such as the name, an address, and a phone number.

In order to obtain a photograph image printed according to the order information described above, the user accesses a customer service system receiving orders from the personal computer or from the order-placing apparatus in a DPE store, and places an order by transferring the order information to the system. The customer service system is a Web site receiving the order information in this printing system. The customer service system receives the order information from the user and transfers the order information to the laboratory. In the laboratory, printing is carried out based on the order information.

However, when a large amount of orders from users are received by the customer service system, the laboratory also has the large amount of orders. Therefore, a load of the laboratory becomes large, since a large amount of prints need to be generated at once. Furthermore, a load of the customer service system is also large, since the system needs to deal with the large amount of orders.

SUMMARY OF THE INVENTION

The present invention has been conceived based on consideration of the above problems. An object of the present invention is therefore to provide a printing system, a printing method, a printing apparatus, an order assigning method and an order assigning apparatus for enabling reduction of loads of a laboratory and a customer service system.

A first printing system of the present invention comprises:

at least one customer service system for receiving, via a network, order information representing the content of an order of a customer for a print;

a plurality of laboratory servers for outputting the print based on the order information transferred via the network from the customer service system that has received the order; and an order assigning system existing between the at-least-one customer service system and the laboratory servers, for receiving the order information from the customer service system, for selecting one of the laboratory servers to output the print based on predetermined information, and for transferring the order information to the selected laboratory server.

The "customer service system" is a Web site on the network for receiving the order information from customers in the printing system of the present invention. For example, a service provider of the printing system requests reception of the order information from a mail-order site, a site of an Internet provider the customers use, and a site providing a plurality of information services so that the sites can participate in the service of the printing system. Although only one customer service system can be used, it is preferable for the printing system to have a plurality of customer service systems.

Image data to be printed by the laboratory server may be transferred from the customer, together with the order information. Alternatively, the image data may be stored in a database of the at-least-one customer service system or the order assigning system.

In the first printing system of the present invention, it is preferable for the customer service system that has received the order information to transfer the order information and flow information representing a flow of the print to the order assigning system so that the order assigning system can use the flow information as the predetermined information.

The "flow information" is information used by the order assigning system for selecting the laboratory server. More specifically, various kinds of information such as an address of the customer, the area code of a phone number of the customer, a code number representing a logistic base determined in the printing system, and information directly specifying one of the laboratory servers can be used as the flow information.

In the first printing system of the present invention, it is preferable for the order assigning system to detect a load status of each of the laboratory servers at the time of receiving the order information so that a result of the detection can be used as the predetermined information.

The "load status of each of the laboratory servers" can be detected based on the number of orders each of the servers is currently dealing with. By using this load status as the predetermined information, the laboratory server having a least load, that is, the laboratory server having the fewest orders in process can be selected. The load status may be detected by asking each of the laboratory servers about the load status at the time of selection. Alternatively, information representing the load status may be stored in a database after the detection so that the information can be referred to in order to detect the load status at the time of selection. In this case, it is preferable for the load status to be updated by subtracting a predetermined number of orders after a predetermined time has elapsed. Alternatively, the load status can be updated by reducing the number of orders after reception of a processing completion notice from each of the laboratory servers. The load status can also be updated in real time by transferring information regarding the number of orders from each of the laboratory servers to the order assigning system.

The predetermined information may be the address of the customer included in the order information or information specifying one of the laboratory servers described in the order information by the customer.

The predetermined information may be the content of the order included in the order information.

Depending on the laboratory servers, the content of the order from the customer cannot be processed in some cases. For example, in the case where the order specifies a print in A4 size, a laboratory server not having a printer dealing with A4 size cannot carry out the printing. Therefore, if the content of the order is used as the predetermined information, one of the laboratory servers enabling processing of the order is selected.

In the first printing system of the present invention, it is preferable for the order assigning system to transfer information related to the selected laboratory to the customer service system that received the order so that the customer service system can generate selection information for determining a desired one of the laboratory servers based on the information. In this case, the selection information is transferred to the order assigning system and the order assigning system uses the selection information as the predetermined information.

A second printing system of the present invention comprises:

a plurality of laboratory servers for outputting a print based on order information representing the content of an order for the print and transferred via a network; and at least one order receiving assigning system for receiving the order information from a customer via the network, for selecting one of the laboratory servers to output the print based on predetermined information, and for transferring the order information to the selected laboratory server.

The "order receiving assigning system" herein referred to has functions of both the customer service system and the order assigning system in the first printing system of the present invention.

In the second printing system of the present invention, it is preferable for the order receiving assigning system or systems to use flow information representing a flow of the print as the predetermined information.

It is also preferable for the order receiving assigning system or systems in the second printing system of the present invention to detect a load status of each of the laboratory servers upon reception of the order information so that a result of the detection can be used as the predetermined information.

The predetermined information may be an address of the customer included in the order information, or information specifying one of the laboratory servers selected by the customer and included in the order information. Alternatively, the predetermined information may be the content of the order in the order information.

In the second printing system of the present invention, it is preferable for the order receiving assigning system or systems to generate selection information by determining a desired one of the laboratory servers based on information related to the selected laboratory server so that the selection information can be used as the predetermined information.

A first printing method of the present invention is a method of outputting a print by using a plurality of laboratory servers based on order information representing the content of an order for the print and transferred via a network, and the first printing method comprises the steps of:

receiving the order information transferred from a customer service system for receiving the order information described by a customer via the network;

selecting one of the laboratory servers to output the print, based on predetermined information; and transferring the order information to the selected laboratory server.

A first printing apparatus of the present invention is an apparatus for outputting a print by using a plurality of laboratory servers based on order information representing the content of an order for the print and transferred via a network, and the first printing apparatus comprises:

reception means for receiving the order information transferred from a customer service system receiving the order information described by a customer via the network;

selection means for selecting one of the laboratory servers to output the print, based on predetermined information; and transfer means for transferring the order information to the selected laboratory server.

A second printing method of the present invention is a method of outputting a print by using a plurality of laboratory servers based on order information representing the content of an order for the print and transferred via a network, and the second printing method comprises the steps of:

receiving the order information described by a customer via the network;

selecting one of the laboratory servers to output the print, based on predetermined information; and transferring the order information to the selected laboratory server.

A second printing apparatus of the present invention is an apparatus for outputting a print by using a plurality of laboratory servers based on order information representing the content of an order for the print and transferred via a network, and the second printing apparatus comprises:

reception means for receiving the order information described by a customer via the network;

selection means for selecting one of the laboratory servers to output the print, based on predetermined information; and transfer means for transferring the order information to the selected laboratory server.

An order assigning method of the present invention comprises the steps of:

receiving order information representing the content of an order for a print described by a customer;

selecting one of laboratory servers to output the print, based on predetermined information; and transferring the order information to the selected laboratory server.

An order assigning apparatus of the present invention comprises:

reception means for receiving order information representing the content of an order for a print described by a customer;

selection means for selecting one of laboratory servers to output the print, based on predetermined information; and transfer means for transferring the order information to the selected laboratory server.

The order assigning method of the present invention may be provided as a program recorded in a computer-readable recording medium to cause a computer to execute the order assigning method.

According to the first printing system of the present invention, the order information is transferred from the customer to the order assigning system via the customer service system that received the order information. The order assigning system then selects one of the laboratory servers as the laboratory server to carry out printing, based on the predetermined information. The order information is transferred to the selected laboratory server and the laboratory server generates the print.

Meanwhile, according to the second printing system of the present invention, the order information is transferred from the customer to one of the at-least-one order receiving assigning system. One of the laboratory servers to output the print is then selected by the order receiving assigning system, based on the predetermined information. The order information is transferred to the selected laboratory server and the print is generated by the selected laboratory server.

Therefore, even in the case where the customer service system or the order receiving assigning system deals with a large amount of the order information, each of the orders can be assigned to any one of the laboratory servers. In this manner, the load of each of the laboratory servers can be reduced. Furthermore, by using more-than-one customer service systems or order receiving assigning systems, interfaces to receive orders in the printing system of the present invention can be increased and loads of the customer service systems or the order receiving assigning systems can be reduced.

Moreover, by using the flow information as the predetermined information, the order assigning system or the order receiving assigning system can select one of the laboratory servers convenient for the customer to receive the print. In this manner, convenience for the customer is also improved.

If the load detection result is used as the predetermined information, one of the laboratory servers not having a large amount of orders can be selected in priority to the other laboratory servers. Therefore, the load of the system can be reduced by distributing the orders.

If the address of the customer included in the order information is used as the predetermined information, the laboratory server that is most accessible for the customer can be selected as the laboratory server to output the print. Therefore, convenience for the customer can be improved.

If the information indicating the laboratory server specified by the customer in the order information is used as the predetermined information, the laboratory server desired by the customer can be selected only by referring to the order information. Therefore, the load of the order assigning system or the order receiving assigning system can be reduced.

If the content of the order is used as the predetermined information, the laboratory server which can deal with the order can be selected as the laboratory server to output the print. Therefore, the order from the customer can be reliably dealt with.

In the first printing system of the present invention, the information related to the laboratory server selected by the order assigning system is transferred to the customer service system and the customer service system selects the desired laboratory server based on the information. The customer service system transfers the selection information indicating the selection to the order assigning system. In this manner, the selection information can be used as the predetermined information for the selecting the laboratory server.

Meanwhile, in the second printing system of the present invention, the desired laboratory server is selected based on the information related to the selected laboratory server and the selection information representing the selection result can be used as the predetermined information for selecting the laboratory server.

In this manner, the laboratory server desired by the customer service system or the order receiving assigning system can be selected as the laboratory server to output the print, and convenience for the customer service system or the order receiving assigning system can be improved.

BRIEF DESCRIPTION OF THE DRAWINGS

FIG. 4 shows the content of a load status table; and

DESCRIPTION OF THE PREFERRED EMBODIMENTS

Hereinafter, embodiments of the present invention will be explained with reference to the accompanying drawings.

Figure 1:
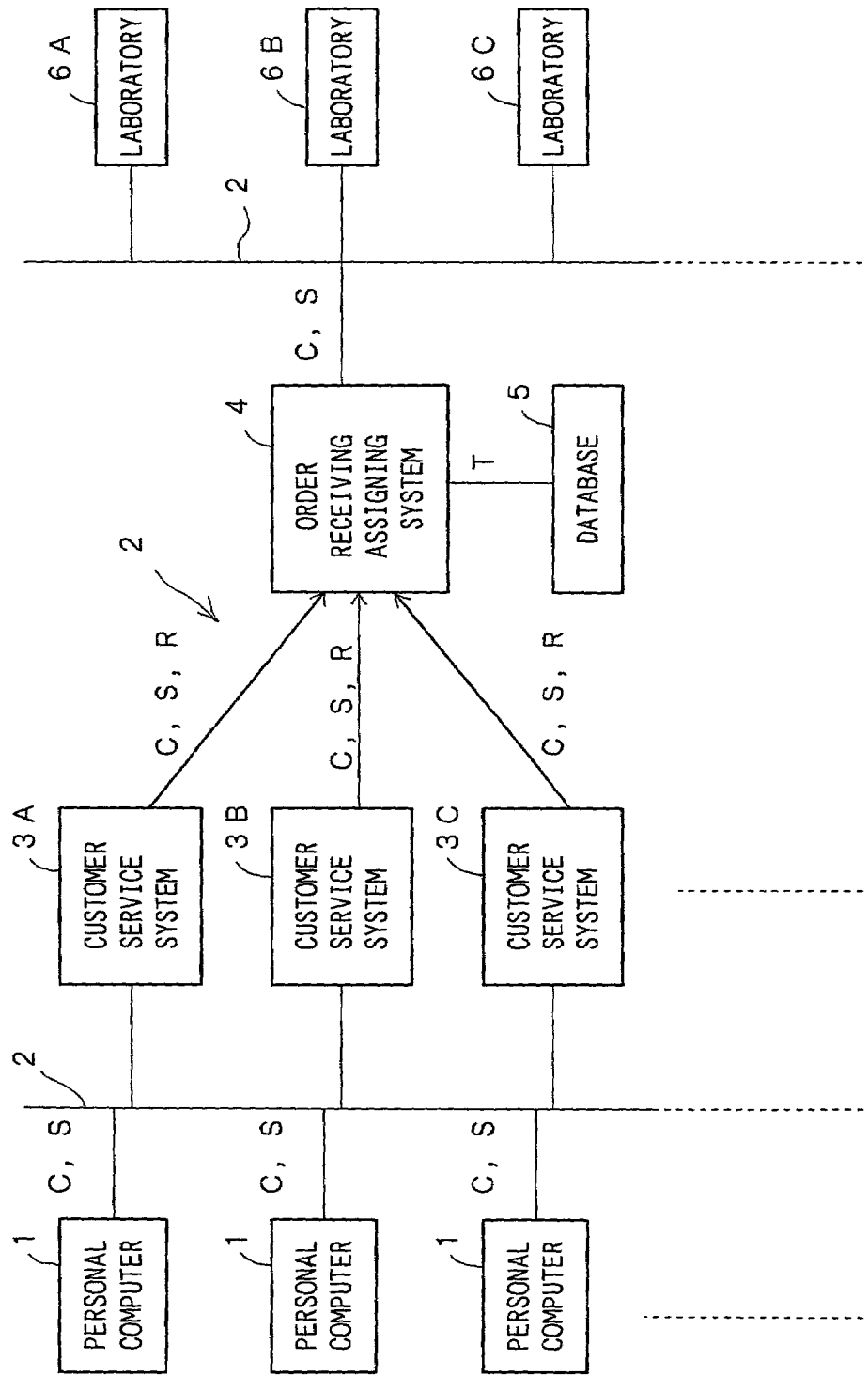
FIG. 1 is a block diagram showing a configuration of a printing system as an embodiment of the present invention.

FIG. 1 is a block diagram showing a configuration of a printing system as an embodiment of the present invention. As shown in FIG. 1, the printing system in this embodiment comprises a personal computer 1 owned by a user, customer service systems 3A~3C, an order assigning system 4, and laboratories 6A~6C, all connected to each other via a network 2. The personal computer 1 stores image data S owned by the user, and the user describes the content of an order for printing the image data S as order information C by using the personal computer 1, and transfers the order information C and the image data S to any one of the customer service systems 3A~3C.

The customer service systems 3A~3C are Web sites on the network 2 for receiving the order information C from the user. The customer service systems are sites having users as members, such as a site for carrying out a mail-order service, a site providing various kinds of information services to the users, and a site of an Internet provider the users use. The customer service systems are not limited to the above examples. The user accesses a desired one of the customer service systems 3A~3C by using a Web browser installed in the personal computer 1, and transfers the order information C and the image data S to the desired customer service system. The customer service system desired by the user receives the order information C and the image data S, and generates flow information R transferred together with the information and the data to the order assigning system 4. The flow information R is information the order assigning system 4 refers to upon assigning the order to one of the laboratories, which will be explained later. More specifically, the flow information can be a code number indicating a logistic base of the customer service system, the name of the laboratory from which the printing is requested, or an address of the user. In this embodiment, the customer service systems 3A~3C respectively use the code number, the laboratory name, and the user address as the flow information R.

The order assigning system 4 refers to the flow information R from the customer service system and selects one of the laboratories 6A~6C as the laboratory to carry out the printing. The order information C and the image data S are transferred to the selected laboratory. The order assigning system 4 is connected to a database 5 and the database 5 stores a table T showing a relationship between the customer service systems 3A~3C, the flow information R, and the laboratories 6A~6C.

Figure 2:
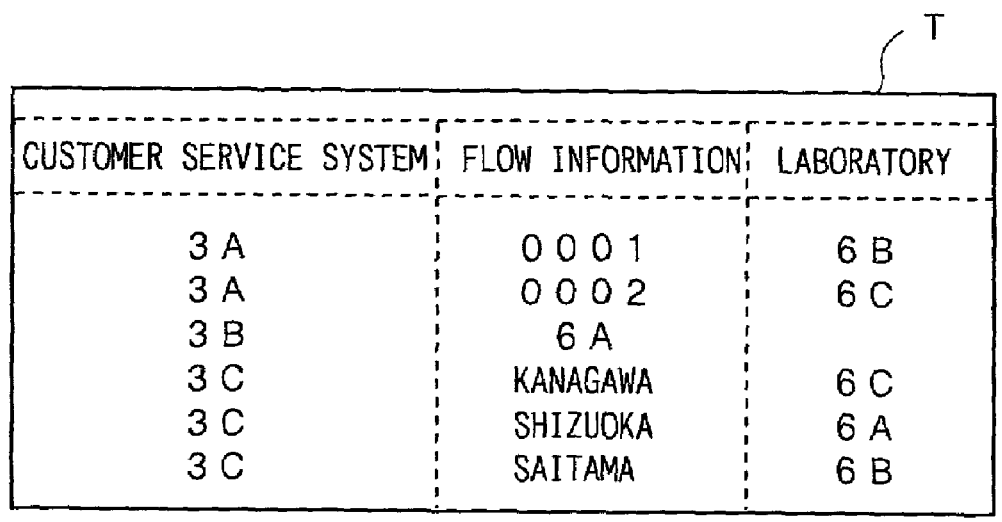
FIG. 2 shows the content of a flow information table.

FIG. 2 shows an example of the table T. As shown in FIG. 2, two rows from the top of the table are related to the customer service system 3A, and the flow information R is represented by a code number. A code number "0001" is related to the laboratory 6B and a code number "0002" is related to the laboratory 6C. In this manner, one of the laboratories closest to the user is selected based on the code number. A third row from the top is related to the customer service system 3B, and the flow information R is represented by the name of the laboratory "6A". Fourth to sixth rows from the top are related to the customer service system 3C and the address of the user is used as the flow information R. An address "Kanagawa" is related to the laboratory 6C, and an address "Shizuoka" is related to the laboratory 6A. An address "Saitama" is also related to the laboratory 6C. In this manner, the laboratory closest to the user's address is selected. The order assigning system 4 receives the image data S, the order information C, and the flow information R from the customer service system and selects one of the laboratories 6A~6C to carry out printing based on the order information C, by referring to the database 5 based on the flow information R. The order assigning system then transfers the image data S and the order information C to the selected laboratory.

Each of the laboratories 6A~6C has a printer to print the image data S. The printer prints the image data S based on the order information C by receiving the order information C and the image data S transferred from the order assigning system 4.

Figure 3:
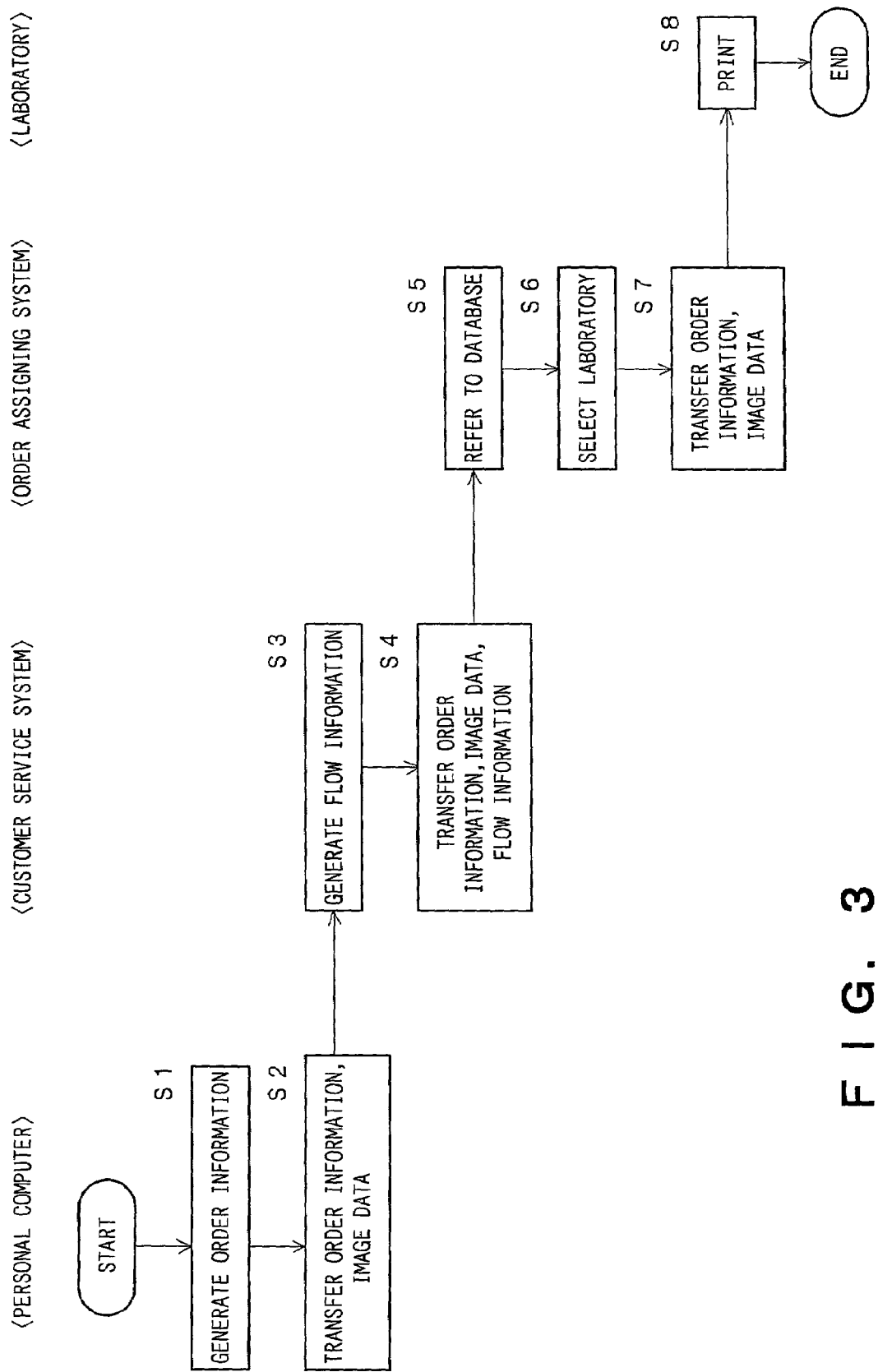
FIG. 3 is a flow chart showing processing in this embodiment.

Operation of this embodiment will be explained next. FIG. 3 is a flow chart showing the operation. The user generates the order information C for placing the order, by using the personal computer 1 (Step S1). The user transfers the order information C and the image data S to any one of the customer service systems 3A~3C (Step S2). In this embodiment, the information and the data are assumed to have been transferred to the customer service system 3C. The customer service system 3C receives the order information C and the image data S, and generates the flow information R (Step S3). In this embodiment, the address of the user, "Kanagawa", is used as the flow information R. The order information C, the image data S and the flow information R are then transferred to the order assigning system 4 (Step S4).

The order assigning system 4 receives the order information C, the image data S, and the flow information R, and refers to the database 5 (Step S5). Based on the flow information R, the order assigning system 4 selects one of the laboratories 6A~6C to carry out the printing (Step S6). In this embodiment, the user has requested printing from the customer service system 3C and the customer service system 3C has generated the flow information "Kanagawa". Therefore, the order assigning system 4 selects the laboratory 6C by referring to the table T shown in FIG. 2. The order assigning system 4 transfers the order information C and the image data S to the selected laboratory 6C (Step S7). Based on the order information C, the laboratory 6C outputs the image data S (Step S8), and the procedure ends.

As has been described above, in this embodiment, the order assigning system 4 selects one of the laboratories 6A~6C to carry out printing, based on the flow information R. The selected laboratory then carries out the printing. Therefore, even in the case where the customer service systems 3A~3C have a large amount of orders, each order can be assigned to any one of the laboratories 6A~6C, and the load of each laboratory can be reduced. Furthermore, since the three customer service systems are used, interfaces for order reception can be increased. In this manner, loads of the customer service systems 3A~3C can be reduced.

In the above embodiment, one of the laboratories 6A~6C to carry out the printing is selected based on the flow information R. However, one of the laboratories may be selected based on the content of the order described in the order information C. Assume that the laboratory 6A carries out printing of postcards and ordinary prints, while the laboratory 6B carries out printing of ordinary prints only. The laboratory 6C carries out printing of enlargements and ordinary prints. If the content of the order described in the order information C specifies a "postcard", the order assigning system 4 selects the laboratory 6A. If the content of the order in the order information C describes an "enlargement", the laboratory 6C is selected. If the content specifies an ordinary print, any one of the laboratories 6A~6C can be selected.

Furthermore, since the order information C generally has the address and the phone number of the user, the order assigning system 4 may select any one of the laboratories 6A~6C convenient for the user, based on the address and the area code of the phone number described in the order information C, without generating the flow information R.

In the above embodiment, the customer service system that received the order information C generates the flow information R, and the order assigning system 4 selects the laboratory to carry out the printing, based on the flow information R. However, without generation of the flow information R by the customer service system, the order assigning system 4 may select the laboratory to carry out the printing, based on a load of each of the laboratories 6A~6C. In this case, the database 5 has a table T0 indicating the load status of each of the laboratories 6A~6C as shown in FIG. 4, instead of the table T shown in FIG. 2. The table T0 shows, as the load status, the number of orders each of the laboratories is currently dealing with.

In this case, the order information C and the image data S are transferred to the order assigning system 4 without generation of the flow information R by the customer service system. The order assigning system 4 receives the order information C and the image data S, and refers to the table T0 in the database 5 to select the laboratory having the smallest load, that is, the laboratory having the fewest orders. In this embodiment, since the laboratories 6A~6C have 4323, 217, and 1023 orders respectively, the laboratory 6B having the fewest orders is selected. The order information C and the image data S are transferred to the selected laboratory 6B and printing is carried out by the laboratory 6B.

The table T0 is updated by subtracting a predetermined number from the numbers of orders of the laboratories 6A~6C in accordance with time elapsed, or by reducing the numbers of orders after receiving notices of processing completion from the laboratories 6A~6C. Alternatively, without storing the table T0 in the database 5, the order assigning system 4 may ask each of the laboratories 6A~6C about the load status upon selection of the laboratory so that the laboratory can be selected based on the load status. Moreover, the load status may be updated in real time by receiving information on the load status from the laboratories 6A~6C.

In the above embodiment, the order assigning system 4 may transfer a laboratory selection result to the customer service system that received the order information so that the customer service system can confirm the selection result. In this case, the selection result indicating only one of the laboratories 6A~6C may be transferred to the customer service system. Alternatively, a selection result indicating two or three of the laboratories 6A~6C as candidates may be transferred to the customer service system. In the former case, the customer service system transfers information indicating agreement to the selected laboratory to the order assigning system 4, and the order assigning system 4 transfers the order information C and the image data S to the selected laboratory. If the selected laboratory is not desired, the customer service system transfers information indicating disagreement. The order assigning system 4 selects another one of the laboratories and transfers information indicating the selected laboratory until the customer service system transfers the information indicating agreement to the selection.

In the latter case, the customer service system selects a desired one of the selected laboratories and transfers information indicating the desired laboratory to the order assigning system 4. The order assigning system 4 transfers the order information C and the image data S to the laboratory desired by the customer service system.

In the above embodiment, the three customer service systems and the three laboratories are used. However, the numbers of the customer service systems and the laboratories can be any numbers larger than one. Furthermore, the number of the customer service systems may be one.

In the above embodiment, the image data S are transferred from the personal computer 1 of the user, together with the order information C. However, the image data S of the user may be stored in a database of the customer service systems or the order assigning system 4 so that the image data S stored in the database can be read from the database to be transferred to any one of the laboratories 6A~6C, based on information specifying the image data S described in the order information C. By storing the image data S in the customer service systems or the order assigning system, the number of transmissions of the image data S having a large amount of data can be reduced and efficient data transfer can be carried out. Furthermore, since the user transfers only the order information C having a small amount of data, an access time can be reduced compared with the case of transferring the image data S, which leads to a reduction in costs such as an access fee for the user.

Figure 5:
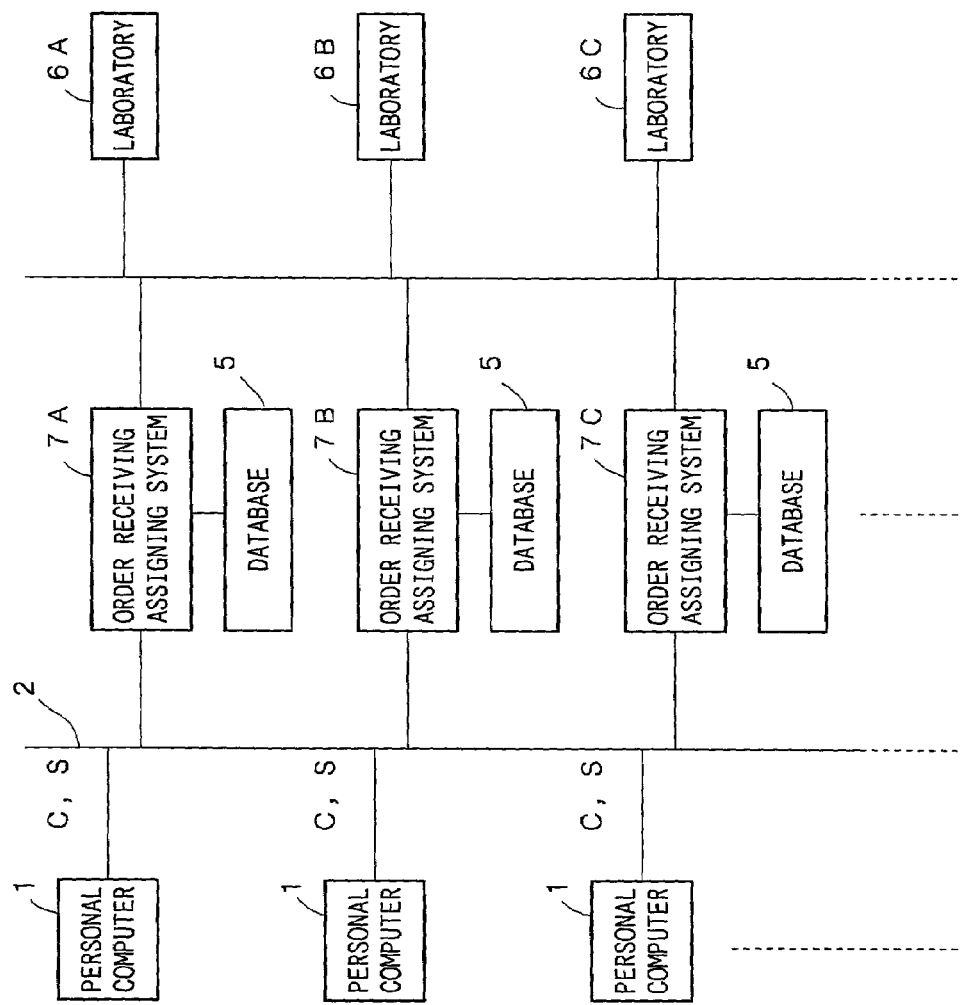
FIG. 5 is a block diagram showing a configuration of a printing system according to another embodiment of the present invention.

In the above embodiment, the customer service systems 3A~3C and the order assigning system 4 are used separately, and the order information C from the user is received by any one of the customer service systems 3A~3C to be transferred to the order assigning system 4. However, as shown in FIG. 5, order receiving assigning systems 7A~7C having the functions of the customer service systems 3A~3C and the order assigning system 4 may be used. In this case, the order receiving assigning systems 7A~7C are respectively connected to databases 5 which are the same as the database 5 connected to the order assigning system 4 in the above embodiment. When any one of the order receiving assigning systems 7A~7C receives the order information C and the image data S transferred from the personal computer 1 of the user, the database 5 connected thereto is referred to. Based on the address of the user or the like included in the order information C, the laboratory to carry out the printing is selected from the laboratories 6A~6C, and the order information C and the image data S are transferred to the selected laboratory (laboratory 6C, for example). The laboratory 6C receives the order information C and the image data S, and prints the image data S based on the order information C to end the procedure.

What is claimed is:

1. A printing system comprising:
   at least one customer service system for receiving, via a network, order information sent by a customer and representing at least one print service to be performed on image data;
   a plurality of servers for performing print services on image data; and
   an order assigning system existing between the at-least-one customer service system and the servers, for receiving the order information from the customer service system, for selecting one of the servers to perform the at least one print based on predetermined information, and for transferring the order information to the selected server;
   wherein the order assigning system transfers laboratory information regarding at least one of the servers to the customer service system that received the order information,
   the customer service system generates selection information for determining the selected server based on the laboratory information transferred from the order assigning system, and transfers the selection information to the order assigning system, and
   the order assigning system uses the selection information as the predetermined information,
   wherein the selection information includes a candidate list of candidate servers determined based at least on the laboratory information transferred from the order assigning system, wherein the customer service system allows a user to designate the desired one of the servers from the selection information, wherein the order assigning system uses the user designation as the predetermined information, and
   wherein the order assigning system determines the selected server based on the laboratory information and customer-specific information, wherein the laboratory information is based on the location of the at least one laboratory and said customer-specific information is a customer's address or a customer's area code.

2. The printing system of claim 1, wherein the order assigning system determines the selected server based on the laboratory information and the at least one print service represented by the order information.

3. The printing system of claim 2, wherein the laboratory information includes information regarding the capability of the at least one laboratory for performing the particular print service.

4. The printing system of claim 1, wherein the laboratory information includes information regarding a load status of the at least one server.

5. The printing system of claim 4, wherein the load status of the at least one server is determined by querying, at the time of selection, the at least one server for load status information.

6. The printing system of claim 4, wherein the load status of the at least one server is determined by querying, at the time of selection, a database containing load status information for the at least one server.

7. A printing system comprising:
   a plurality of servers for outputting a print; and
   at least one order receiving assigning system comprising
       a customer service system for receiving, via a network, order information sent by a customer and representing at least one print service to be performed on image data and including customer information from a customer, and an assigning system for selecting, based on predetermined information, one of the servers to receive the order information, and for transferring the order information to the selected server;

wherein the order receiving assigning system or systems generate selection information for determining the selected server based on laboratory information related to at least one of the plurality of servers, and use the selection information as the predetermined information, wherein the selection information includes a candidate list of candidate servers determined based at least on the laboratory information, wherein the customer service system allows a user to designate the desired one of the servers from the selection information and wherein the order assigning system uses the user designation as the predetermined information, and wherein the selected server is determined based on the laboratory information and customer-specific information and wherein the laboratory information includes the location of the at least one laboratory and said customer-specific information is a customer's address or a customer's area code.

8. The printing system of claim 7, wherein the selected server is determined based on the laboratory information and the at least one print service represented by the order information.

9. The printing system of claim 8, wherein the laboratory information includes information regarding the capability of the at least one laboratory for performing the particular print service.

10. The printing system of claim 7, wherein the laboratory information includes a determined load status of the at least one server.

11. The printing system of claim 10, wherein the load status of the at least one server is determined by querying, at the time of selection, the at least one server for load status information.

12. The printing system of claim 10, wherein the load status of the at least one server is determined by querying, at the time of selection, a database containing load status information for the at least one server.

* * * * *